(12) United States Patent
Chen

(10) Patent No.: US 9,760,696 B2
(45) Date of Patent: Sep. 12, 2017

(54) SECURE PHYSICAL AUTHENTICATION INPUT WITH PERSONAL DISPLAY OR SOUND DEVICE

(71) Applicant: EXCALIBUR IP, LLC, New York, NY (US)

(72) Inventor: Zordius Chen, Taipei (TW)

(73) Assignee: EXCALIBUR IP, LLC, New York, NY (US)

( * ) Notice: Subject to any disclaimer, the term of this patent is extended or adjusted under 35 U.S.C. 154(b) by 0 days.

(21) Appl. No.: 14/038,783

(22) Filed: Sep. 27, 2013

(65) Prior Publication Data
US 2015/0096012 A1 Apr. 2, 2015

(51) Int. Cl.
G06F 21/00 (2013.01)
G06F 21/31 (2013.01)
G06F 21/42 (2013.01)
G06F 21/84 (2013.01)

(52) U.S. Cl.
CPC ............ G06F 21/31 (2013.01); G06F 21/42 (2013.01); G06F 21/84 (2013.01)

(58) Field of Classification Search
CPC ...... G06F 21/6218; G06F 21/31; G06F 21/84; G06F 21/42
USPC .......... 726/17; 713/155, 159, 184, 185, 186, 713/193
See application file for complete search history.

(56) References Cited

U.S. PATENT DOCUMENTS

| | | | | |
|---|---|---|---|---|
| 5,422,812 A * | 6/1995 | Knoll | ..................... | B60Q 3/042 340/990 |
| 6,002,379 A * | 12/1999 | Udagawa | ................. | G01C 3/04 340/995.1 |
| 6,822,585 B1 * | 11/2004 | Ni | ......................... | G06F 3/0237 341/22 |
| 7,296,233 B2 * | 11/2007 | Tan | ..................... | G06F 3/04886 715/741 |
| 7,342,514 B1 * | 3/2008 | Bailey | .................. | G01C 23/005 340/961 |
| 7,382,288 B1 * | 6/2008 | Wilson | ................... | G01C 23/00 340/961 |
| 7,395,506 B2 * | 7/2008 | Tan | ..................... | G06F 3/04886 705/18 |
| 7,564,372 B1 * | 7/2009 | Bailey | .................... | G01C 23/00 340/961 |
| 7,928,862 B1 * | 4/2011 | Matthews | ............... | G01C 23/00 244/17.11 |
| 8,217,856 B1 * | 7/2012 | Petrou | .................. | G02B 27/017 345/8 |
| 9,152,831 B2 * | 10/2015 | Papagrigoriou | ..... | G06K 7/0065 |
| 9,386,009 B1 * | 7/2016 | Marion | ................. | H04L 63/083 |
| 2002/0101988 A1 * | 8/2002 | Jones | ....................... | G09C 5/00 380/54 |

(Continued)

Primary Examiner — David García Cervetti
(74) Attorney, Agent, or Firm — James J. DeCarlo; Greenberg Traurig, LLP

(57) ABSTRACT

A secure user input system is implemented for a computer system having a user input apparatus and a user output apparatus. The system comprises a user input template, provided to the user on the user output apparatus; and a personal user output interface providing, to the user, personal input interface information, mapped to the user input template, to enable the user to input information through the user input apparatus that is intelligible only to a party having access both to the user input template and the personal input interface information.

18 Claims, 7 Drawing Sheets

(56) References Cited

U.S. PATENT DOCUMENTS

| | | | |
|---|---|---|---|
| 2002/0188872 A1* | 12/2002 | Willeby | G06F 3/04886 726/7 |
| 2003/0095053 A1* | 5/2003 | Kandogan | G06F 3/0233 341/22 |
| 2003/0115146 A1* | 6/2003 | Lee | G06F 21/10 705/57 |
| 2003/0115147 A1* | 6/2003 | Feldman | G06F 21/10 705/64 |
| 2003/0135465 A1* | 7/2003 | Lee | G06F 21/10 705/51 |
| 2003/0149668 A1* | 8/2003 | Lee | G06Q 20/382 705/51 |
| 2003/0185395 A1* | 10/2003 | Lee | G06F 21/10 380/277 |
| 2003/0188175 A1* | 10/2003 | Volk | G06F 21/10 713/191 |
| 2003/0193411 A1* | 10/2003 | Price | G01C 23/005 340/973 |
| 2005/0237228 A1* | 10/2005 | Salman | G06F 3/0219 341/22 |
| 2005/0251752 A1* | 11/2005 | Tan | G06F 3/04886 715/741 |
| 2005/0259035 A1* | 11/2005 | Iwaki | G06F 3/011 345/8 |
| 2006/0044265 A1* | 3/2006 | Min | G02B 27/017 345/156 |
| 2006/0061544 A1* | 3/2006 | Min | G02B 27/0093 345/156 |
| 2006/0224523 A1* | 10/2006 | Elvitigala | G06F 3/04886 705/64 |
| 2006/0241861 A1* | 10/2006 | Takashima | G01C 21/3673 345/467 |
| 2006/0267804 A1* | 11/2006 | Pham | G06F 3/0236 341/22 |
| 2007/0182595 A1* | 8/2007 | Ghasabian | G06F 1/1615 341/22 |
| 2007/0279256 A1* | 12/2007 | Salman | G06F 3/0219 341/23 |
| 2008/0165035 A1* | 7/2008 | Bhella | G06F 3/0238 341/23 |
| 2009/0106825 A1* | 4/2009 | Cerruti | G06F 21/31 726/5 |
| 2009/0106827 A1* | 4/2009 | Cerruti | G06F 21/31 726/7 |
| 2010/0099463 A1* | 4/2010 | Kim | G06F 1/1624 455/566 |
| 2010/0110368 A1* | 5/2010 | Chaum | G02B 27/017 351/158 |
| 2010/0149073 A1* | 6/2010 | Chaum | G02B 27/0093 345/8 |
| 2010/0177035 A1* | 7/2010 | Schowengerdt | G06F 1/163 345/156 |
| 2011/0006996 A1* | 1/2011 | Smith | G06F 3/04886 345/173 |
| 2011/0012838 A1* | 1/2011 | Pance | G06F 3/03543 345/173 |
| 2011/0052042 A1* | 3/2011 | Ben Tzvi | G06T 19/006 382/154 |
| 2012/0154181 A1* | 6/2012 | Rhee | H03M 11/08 341/26 |
| 2013/0091583 A1* | 4/2013 | Karroumi | G06F 3/0236 726/26 |
| 2013/0222371 A1* | 8/2013 | Reitan | G06T 19/006 345/419 |
| 2013/0249948 A1* | 9/2013 | Reitan | G06F 3/011 345/633 |
| 2014/0009399 A1* | 1/2014 | Zhang | H04M 1/23 345/169 |
| 2014/0047374 A1* | 2/2014 | He | G06F 3/048 715/773 |
| 2014/0049474 A1* | 2/2014 | Singh | G06F 3/013 345/168 |
| 2014/0055343 A1* | 2/2014 | Kim | G06F 3/005 345/156 |
| 2014/0063061 A1* | 3/2014 | Reitan | G09G 3/003 345/633 |
| 2014/0310531 A1* | 10/2014 | Kundu | G06F 21/35 713/186 |
| 2014/0320411 A1* | 10/2014 | Kuzmin | G06F 3/04886 345/168 |
| 2014/0331146 A1* | 11/2014 | Ronkainen | G06F 3/0482 715/741 |
| 2014/0359514 A1* | 12/2014 | Park | G06F 3/04886 715/773 |
| 2015/0067825 A1* | 3/2015 | Mese | G06F 21/36 726/19 |

* cited by examiner

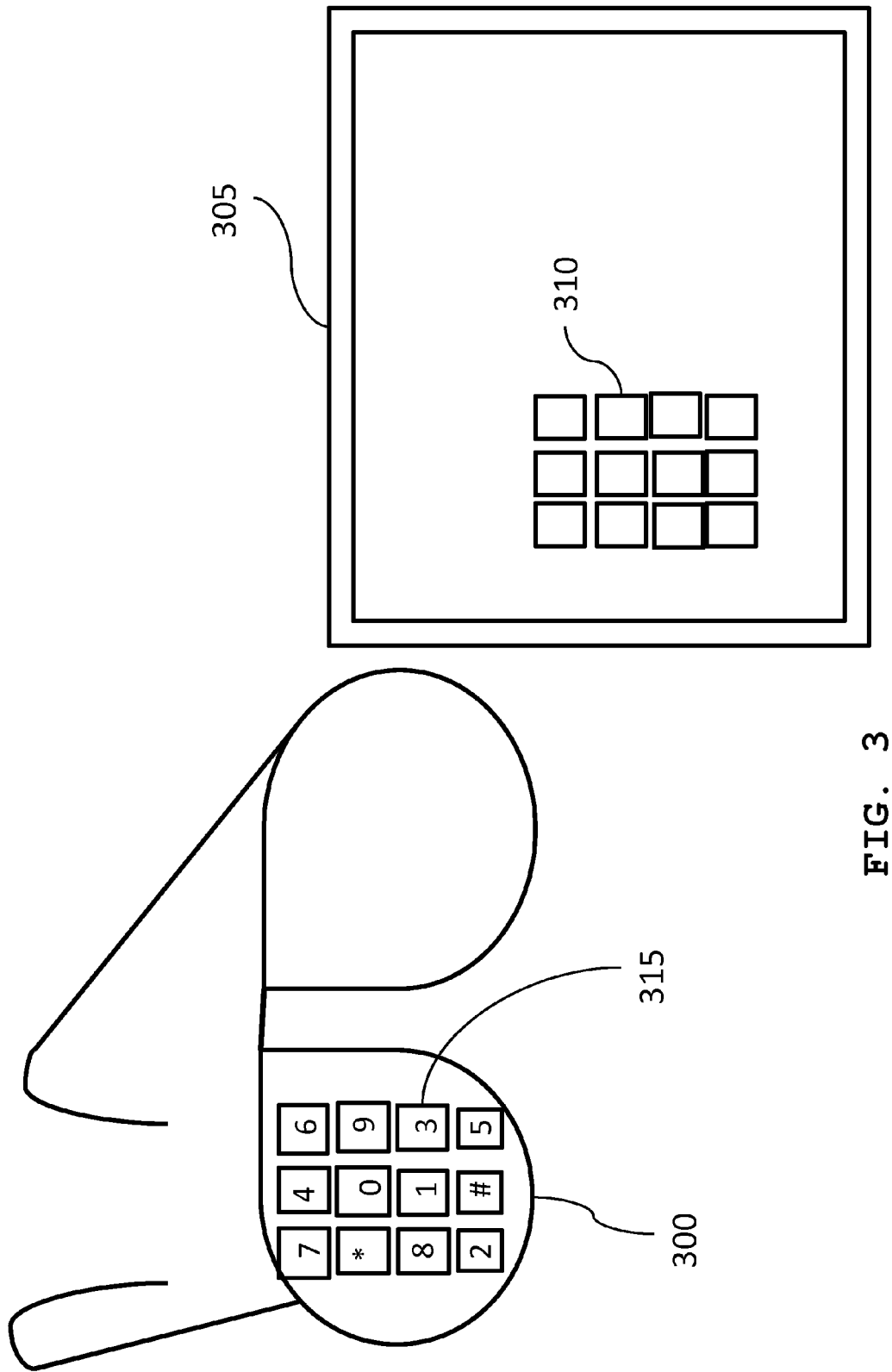

SECURE PHYSICAL AUTHENTICATION INPUT WITH PERSONAL DISPLAY OR SOUND DEVICE

FIELD OF THE ART

The present subject matter generally relates to the field of computer user interfaces. The disclosure pertains to secure user entry of information through a user interface, so as to prevent unauthorized observation or eavesdropping.

BACKGROUND

Users of computer systems, or related appliances such as laptops, tablets, smart phones, etc., enter information through a keyboard, cursor click device such as a mouse, or other interface device that involves interaction between the user and displayed information. Another person (hereinafter referred to as "unauthorized person," "eavesdropper," "trojan," or the like) may observe the user's data entry, and learn information that the user would prefer to keep private. Such information may include system passwords, or other information whose confidentiality has value to the user. Because many types of electronic computer-based appliances are small, lightweight and portable, unauthorized persons have many opportunities to observe a user's private information. Also, surveillance software such as keylogger, screenlogger, and Trojan horse software may be provide unauthorized persons with access to a user's private information entered through the user interface.

SUMMARY

A secure user input system is implemented for a computer system having a user input apparatus and a user output apparatus. The system comprises a user input template, provided to the user on the user output apparatus; and a personal user output interface providing, to the user, personal input interface information, mapped to the user input template, to enable the user to input information through the user input apparatus that is intelligible only to a party having access both to the user input template and the personal input interface information.

A computer-implemented method for secure user input to a computer system, the computer system having a user input apparatus and a user output apparatus, comprises providing a user input template to the user on the user output apparatus; and providing, to the user, personal input interface information over a personal user output interface, the personal input interface information being mapped to the user input template, to enable the user to input information through the user input apparatus that is intelligible only to a party having access both to the user input template and the personal input interface information.

A computer program product for use with a computer system to provide secure user input to a computer system, the computer system having a user input apparatus and a user output apparatus, comprises a non-transitory computer-readable medium and software thereon for directing the computer system to provide a user input template to the user on the user output apparatus; and to provide, to the user, personal input interface information over a personal user output interface, the personal input interface information being mapped to the user input template, to enable the user to input information through the user input apparatus that is intelligible only to a party having access both to the user input template and the personal input interface information.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Further features and advantages of embodiments of the subject matter disclosed herein, as well as the structure and operation of preferred embodiments, are described in detail below with reference to the accompanying exemplary drawings.

DESCRIPTION OF DRAWINGS

In the following drawings like reference numbers are used to refer to like elements. Although the following figures depict various examples of the invention, the invention is not limited to the examples depicted in the figures.

FIG. 3 is an illustration of a public display on a user output apparatus, and a personal user output interface shown as a private user appliance, showing publicly viewable input-related information and personal interface information according to a first embodiment.

DETAILED DESCRIPTION

A computer-implemented method, computer program product, and system for providing secure user interface data entry are disclosed. The following detailed description is intended to provide example implementations to one of ordinary skill in the art, and is not intended to limit the invention to the explicit disclosure, as one of ordinary skill in the art will understand that variations can be substituted that are within the scope of the invention as described.

The entry of user information through a user interface often involves user interaction with input-related information that is displayed, on a user output apparatus, for the user to view. For instance, the displayed input-related information might include a user input template, in the form of a representation of a keyboard or keypad, or other array of selectable input information, for the user to select, for instance by moving and clicking a mo0use on displayed key values. Another example is that a standard form, with pre-specified information and user data entry fields may be displayed on the user output apparatus. The user employs a user input apparatus, such as a keyboard, mouse, etc., and selects a field for data entry, and proceeds to enter data, for instance by typing text, which is inserted at that data entry field.

To protect private information as it is entered through a user interface using a user input apparatus of a computer-based device, embodiments of the present subject matter employs a personal user output interface device, such as a personal display device or a personal sound device, to provide the user with personal input interface information, herein also called personal interface information, that is pertinent to the entry of information through the user interface. In some embodiments, to be discussed in detail below, there is a direct relationship between the input-related information and the personal user output interface information. Without access to that personal user output interface information, an unauthorized person who only has access to the input-related information does not have sufficient information to be able to know what user information is being entered through the user interface.

Figure 1:
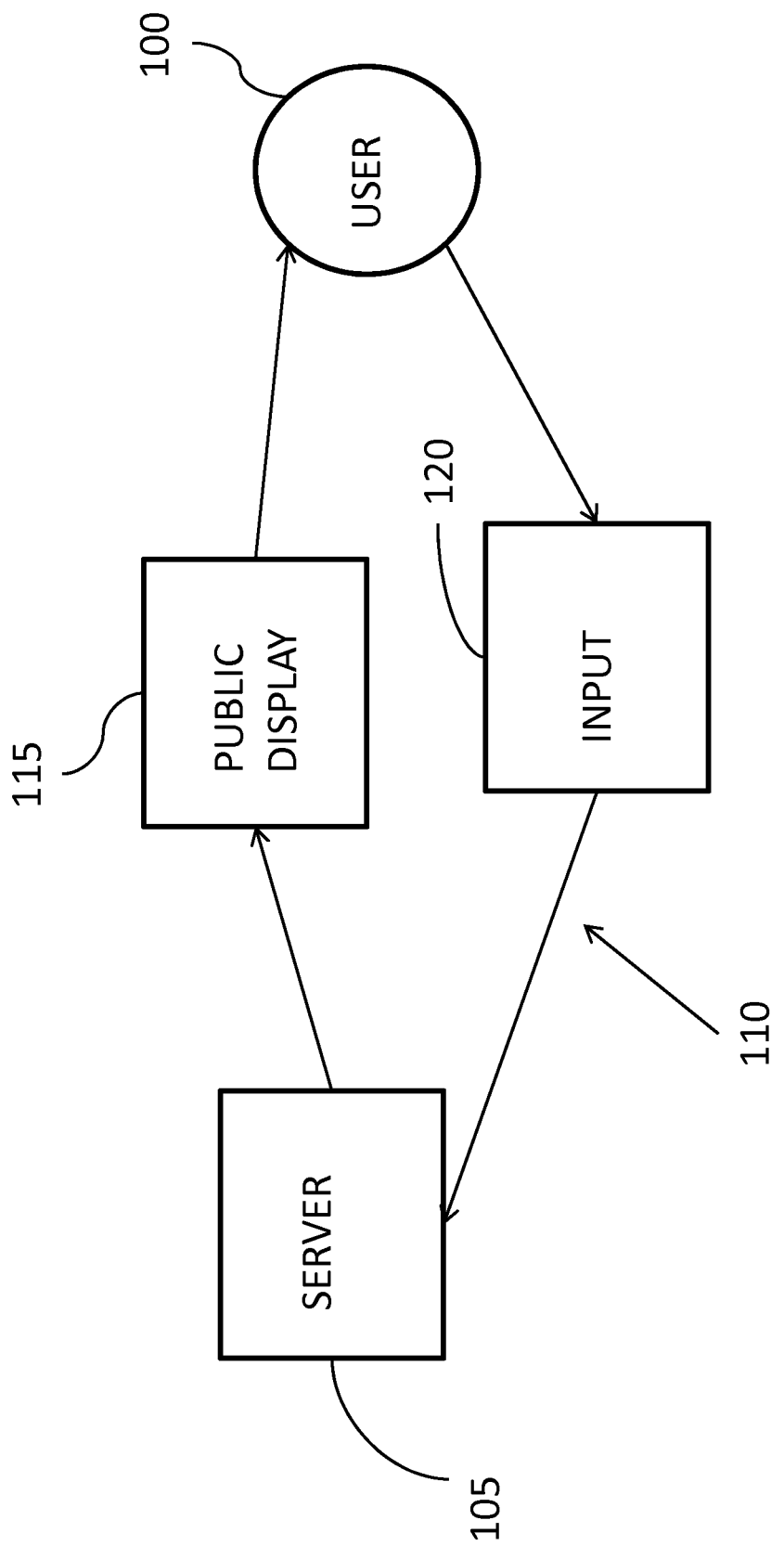
FIG. 1 is a block diagram of a conventional computer user interface arrangement.
Figure 2:
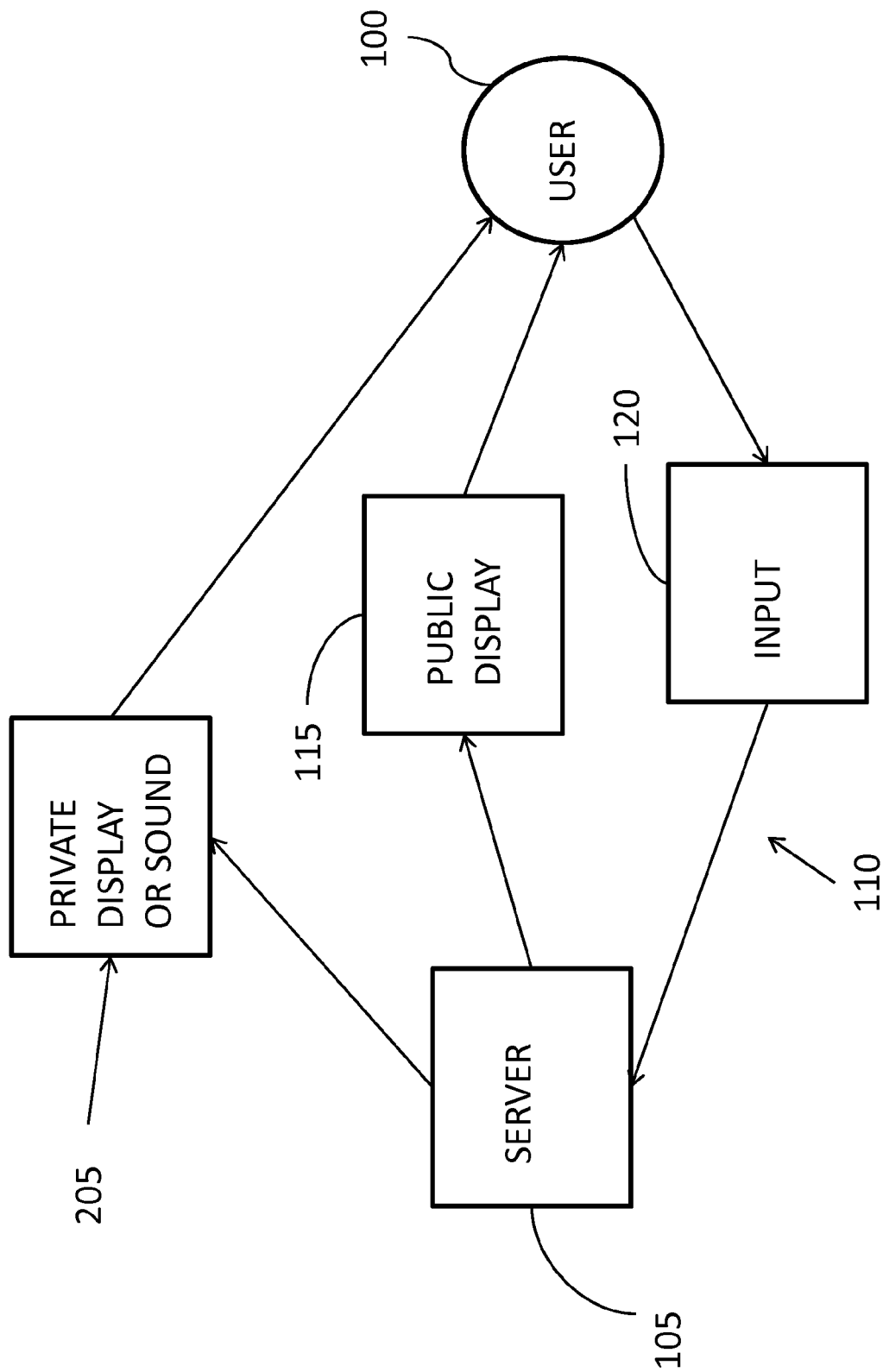
FIG. 2 is a block diagram of a computer user interface arrangement according to an embodiment.

FIGS. 1 and 2 are block diagrams which illustrate, respectively, a conventional user interface date entry arrangement, and a user interface data entry arrangement according to an embodiment.

A Conventional Arrangement

Referring first to the conventional arrangement of FIG. 1, a user 100 interfaces with a computer-based system, shown for example as a server 105. A user interface, generally shown as 110, may include a user output apparatus comprising a public display 115, such as a computer screen, for displaying the above-mentioned input-related information. The input-related information may take the form of a user input template, which provides a visual basis for judging how to enter input information. The user 100 sees the input-related information, and enters user input information through a user input interface using a user input apparatus, shown as an input 120, which could for instance be a keyboard, keypad, etc.

It will be understood that, conventionally, the input-related information displayed on the public display 115 may be observed by persons other than the user 100. For instance, an unauthorized person, passing behind the user 100, may be able to look in at the public display 115, and see the displayed input-related information. That unauthorized person will then know what sort of form the user 100 is filling out, will see that data such as a password is being entered, etc.

It will also be understood that the input 120 may be subject to attack from a software eavesdropping tool such as a keylogger, a screenlogger, or a Trojan horse software tool. In such a case, the tool will record or otherwise make available to an unauthorized user the user's data entry.

Thus, it will be seen that the conventional arrangement of FIG. 1 is not secure, but rather is susceptible to surveillance by unauthorized persons.

General Description of Embodiments

By contrast, FIG. 2 illustrates an embodiment of the present subject matter, and may be contrasted with that of the conventional arrangement of FIG. 1. The user 100, the server 105, the user output apparatus shown as the public display 115, and the input 120 are as before, and are numbered as in FIG. 1.

However, in accordance with this embodiment, the user interface 110 additionally includes a personal user output interface, shown for example as a private display or sound 205. (There will be a discussion, below, of alternative embodiments, in which a private display is one class of embodiment, and a private sound is another.) The present illustration, which names them in the alternative, is intended to broadly cover the concept of the personal user output interface, which encompasses multiple alternative embodiments.

In the arrangement of FIG. 1, the private display or sound 205 makes the personal user output interface information available to the user, which cannot be observed by an eavesdropper.

As noted above, there is a class of embodiments which employs a personal user output interface device which includes a personal display device, herein also called a private display. The private display may include a private viewing appliance which the user may use to see the personal interface information.

A First Display Embodiment

Several embodiments will now be illustrated. A first embodiment, shown in FIG. 3 illustrates a personal user output interface, such as a personal display device that may comprise a private viewing appliance shown as a pair of computer interface eyeglasses 300. The computer interface eyeglasses 300 have a form factor, including frames defining a field of vision and ear pieces, for the user to wear on his/her head in normal fashion. The computer interface eyeglasses 300 include a computer interface (not shown), such as a wireless interface for receiving data. The lenses of the computer interface eyeglasses 300 may be transparent, for normal user viewing, but which can also display image data which can be seen by the user wearing the computer interface eyeglasses 300.

FIG. 3 additionally shows a computer screen 305, here shown schematically in rectangular shape. This represents the user output apparatus shown as the public display 115 of FIGS. 1 and 2, and may, for instance, be the display screen of a laptop computer. The computer screen 305 displays the input-related information, here shown as a user input template in the form of a 3×4 array of cells 310, such as the cells of a numeric keypad. The disposition of the twelve cells defines relative positioning of the twelve keypad keys. Thus, an unauthorized viewer observing this computer screen 305 would be able to see that a numeric keypad was being displayed.

Note, however, that in accordance with an embodiment, the key values 0 through 9, * and #, are not part of the input-related information, and are not displayed. Thus, if an unauthorized viewer sees this keypad, he cannot tell which key values go with which keys. If he observes a user clicking on the keys of a user input apparatus, he nevertheless cannot tell what numeric information is being keyed in.

The user, however, has the personal user output interface. In this embodiment, the user employs the personal user output interface in the form of a personal display device. That is, he/she is wearing the private user appliance; in this case, the computer interface eyeglasses 300. As part of the user interface 110, the computer interface eyeglasses 300 display personal user output interface information, shown here as a keypad 315, in which keypad numbers and symbols are displayed. In an embodiment, the computer interface eyeglasses 300 are position- and attitude-aware. The user interface 110 includes correlation software for correlating the publicly visible input-related information (in this case, the user input template in the form of the keyboard cell array 310) with the personal interface user output information (in this case, the keypad 315). Thus, the user interface 110 displays the personal user output interface information keypad 315, such that the user sees the keypad 315 as superimposed directly over the keypad 310.

Note, additionally, the numeric digits and symbols 0-9, * and #, are displayed on the keypad 315 in a non-standard arrangement. Thus, the user has to rely on the keypad display 135 to see which keys of the user input apparatus to click on, but he is able to do so because he can see the numeric and symbols of the personal user output interface information displayed by the computer eyeglasses 300.

The result is that the user can enter information, by clicking on keypad cells, as though the keypad numbers and symbols were displayed on the keypad cell array 310. The unauthorized user, however, can only see the blank cells of the array 310, and cannot tell which numeric values are being entered. This embodiment therefore provides security not available with the conventional arrangement of FIG. 1.

More Display Embodiments

A class of additional embodiments will now be discussed. In general, these embodiments also employ a personal user output interface in the form of a personal display device/private display, such as the computer interface eyeglasses 300 of FIG. 3. These embodiments differ from that of FIG. 3 as to the nature of the personal interface information provided. Accordingly, they will be discussed more briefly, and illustrations of the alternative forms of personal interface information will be understood to take the place of the keypad 315 of FIG. 3.

Figure 4:
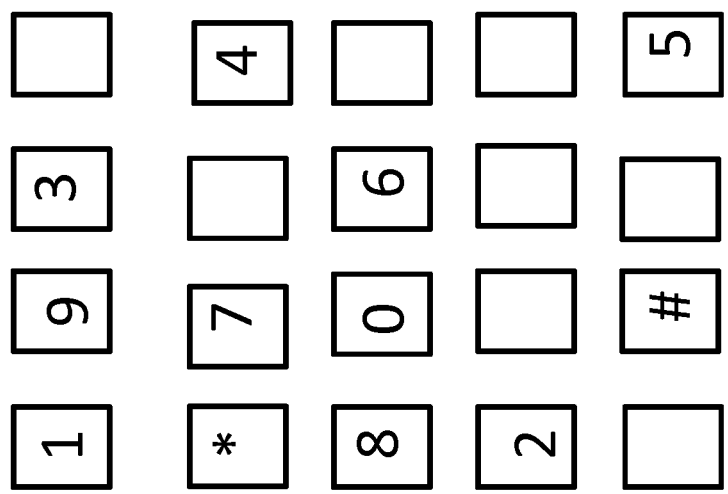

In the embodiment of FIG. 4, a keypad array is provided, having a greater number of cells than the twelve cells that make up a conventional numeric keypad. For instance, FIG. 4 shows a 5x4 array of keypad cells. In this embodiment, the twelve numeric and symbols are assigned, in a non-standard way, to various keys of the keypad. The remaining eight keys are left blank.

If this keypad is displayed on the computer interface eyeglasses 300 of FIG. 3, and a suitable 5x4 array of blank cells is shown on user output apparatus shown as the display screen 305 in place of the keypad array 310, then again the unauthorized user cannot tell which numeric and symbolic values are being clicked on.

Another embodiment, shown in FIG. 5, again makes user of a larger than normal keypad, in this case 5x5 cells. However, this embodiment additionally assigns multiple instances of some of the digits and symbols to the extra keys. Some or all of the extra keys may have numeric or symbol characters. Any suitable number of instances of each of the numeric and symbol characters may be used.

For this embodiment, a potential drawback of the embodiment of FIG. 4 is overcome. If an unauthorized person observes a user employing the embodiment of FIG. 4 for any length of time, the unauthorized person might notice that the user never clicks on certain of the keys (the blank ones). That observation might help the unauthorized person to reduce the amount of uncertainty as to which numeric and symbol characters the user is keying in.

Figure 5:
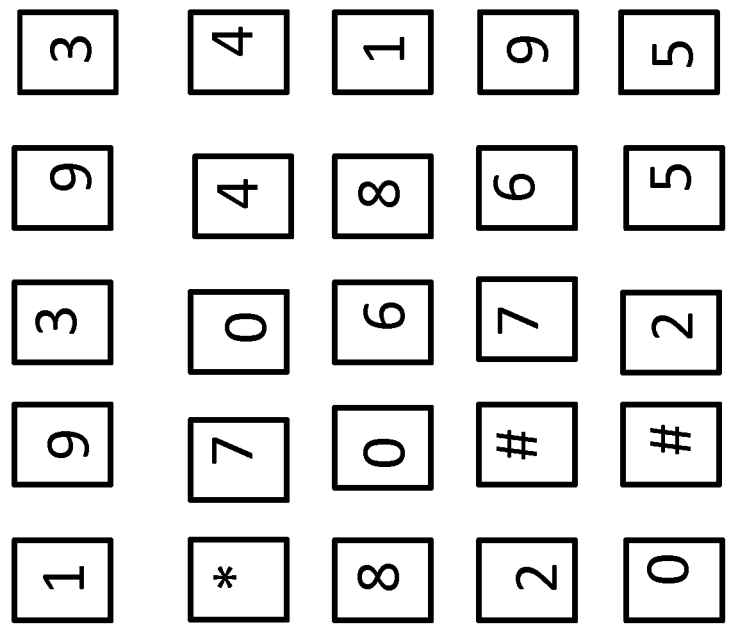
FIGS. 4 and 5 are illustrations of personal interface information, as used in place of the personal interface information 315 of FIG. 3.

The embodiment of FIG. 5, however, forestalls such an observation. Since all (or most) of the keys have characters assigned to them, the user might use all of them, or at any rate more of the keys than are minimally necessary to key in all possible characters. Thus, the unauthorized person might observe key clicks on different keys, and have no way of telling the different keys represent the same numeric or symbol character value.

Yet another embodiment, not illustrated, employs any of the keypads of the embodiments of FIGS. 3 through 5, with or without extra keys, and with or without character values assigned to the extra keys. As before, the character assignments may be in a non-standard configuration.

In this embodiment, however, the key character assignments vary over time. For instance, every so often, such as at regular or user-chosen intervals, the character assignments to the leys are changed. The personal user output interface key character display of the keypad (equivalent to that of the keypad 315, displayed on the private display) is updated, so the user can tell that the key character assignments have changed, and change his click entry accordingly. The unauthorized person, who may notice that the user is clicking different keys, has no way to know that the clicks of the different keys are for entering the same character.

Yet another embodiment can be used with larger user input interfaces, such as full keyboards. In this embodiment, the blank key array is omitted altogether from the user output apparatus shown as the public display 115. Instead, the public display 115 displays a blank screen, or a pattern or image unrelated to the keypad or keyboard array. The user relies entirely on the personal user input interface information shown in the personal display device/private display (such as the computer interface eyeglasses 300). As with the other embodiments, the user is able to enter information as desired. The unauthorized user can only see that cursor movements, and user inputs such as mouse clicks are taking place over the blank screen or unrelated pattern or image, but cannot tell what sort of information, if any, is being entered.

Sound Embodiments

A separate class of embodiments employs a personal user output interface comprising a private display or sound 205, as for instance in the arrangement of FIG. 2, in the form of a sound device such as an audio headset. Alternatively, a mobile device such as a smart phone can be used.

As the user manipulates the mouse or other input device, audio sounds are provided. The sounds can include a voice speaking the name of each letter, character, symbol, etc., over which the mouse is moved. Distinctive sounds can indicate symbols, as an alternative to pedantic statements of their names, such as "exclamation point." (One rather whimsical possibility would be to use the sounds conceived by musician/comedian Victor Borge, as described in his famous "phonetic punctuation" routine.) Other sounds can include a bump or tick as the mouse crosses a boundary between one key and another adjacent one, tones indicating upper-or lower-case characters, special "gold key" functions, etc., or another, distinctively different tone indicating that the mouse has strayed all the way off the keyboard.

As with the previously described embodiments, the unauthorized user can only see the blank keypad array, or other visual image that does not convey which characters are assigned to which positions.

Another embodiment employs a vibration device, comparable to that of a cell phone set for a silent ringing. A vibration is then felt by the user holding the device. Other devices, such as video game controllers, may also have the capacity to vibrate, and thus be usable as well.

Vibrations may serve similar purposes to the sounds made by the just-discussed embodiments. As before, bumps or ticks can indicate passage of the mouse cursor across a boundary between one key and another. To indicate which key the user is on, the vibrations could occur in a coded fashion. For instance when the mouse is on a given numeric key, there could be a number of vibratory pulses, etc., equal to the value of the number. More broadly, a coding scheme, such as the classic Morse Code, could be used to indicate letters or other characters.

System Implementations

Referring back to FIG. 2, it will be seen that a system for implementing an embodiment of the present subject matter includes a computer processing system, such as the server 105, and a standard user interface, such as that generally shown as 110, including the user output apparatus shown as the public display 115 such as a computer display screen, and further including a user input apparatus such as the input 120, which might include conventional keyboard, mouse, etc.

The system additionally employs the personal user output interface such as the private display or sound device 205, which may include a display device such as computer interface eyeglasses, or a portable, fairly easily concealable appliance, such as a smart phone, tablet, etc. While the computer interface eyeglasses advantageously may be correlated with the public display, as described above, embodiments employing other display devices such as those listed just above might be able to correlate other ways, for instance by having a mouse-operated cursor that moves correspondingly with the mouse cursor of the public display 115.

The functionality described heretofore may be implemented using a system, in which suitable system software runs, in order to facilitate such operation. The software may, for instance be resident within the server 105.

Figure 6:
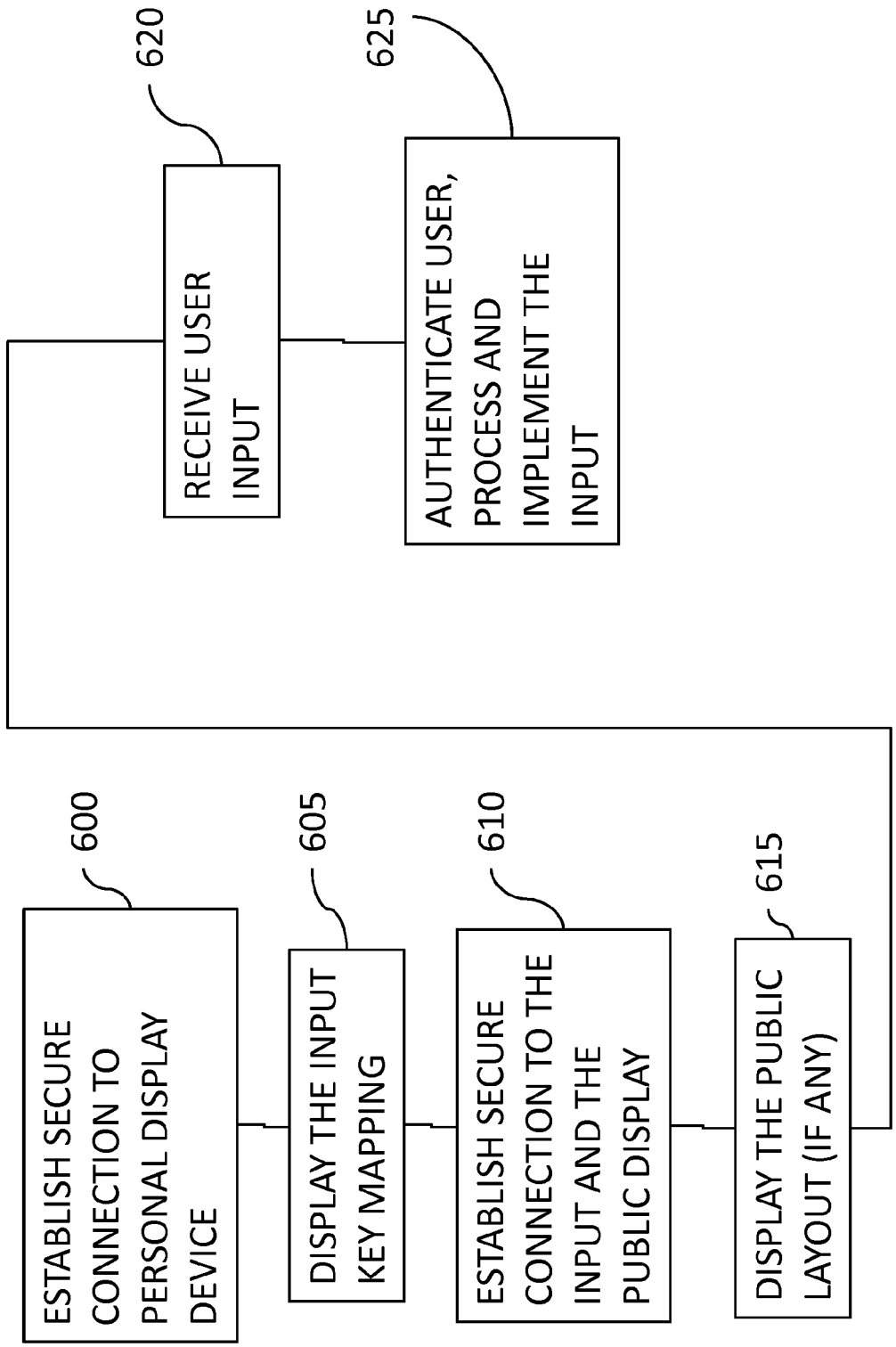
FIGS. 6 and 7 are flowcharts illustrating implementations.

FIG. 6 is flowchart illustrating an embodiment of such software. It will be understood that the software is used to operate a central processing unit within the server 105, and to send and receive data through the interfaces to the public display 115, the user input 120, and the private display or sound 205, however it is implemented for either display or sound.

The embodiment of FIG. 6 applies to those embodiments, discussed above, which utilize a display device as the private display or sound device.

The server, running the software illustrated here, makes a secure connection (600) to the personal display device. This may be done in any suitable fashion, using wireless or other communication, as appropriate, and using suitable coding or encryption for the signals passing to and from the personal display device.

Then, the personal interface information, such as the input key mapping (for instance that shown in the embodiments of FIGS. 3, 4, and 5) is sent to the personal display device for display to the user.

Additionally, and perhaps simultaneously with the foregoing, the server established secure communication (610) with the user output apparatus shown as the public display 115. Again, this may be done in suitable fashion, by suitably encrypted wireless communication, or by hard wiring. Then, the public layout is displayed (615). This is, for instance the blank keypad array 310 of FIG. 3, displayed on the computer screen 305.

Then, user input is received (620) in accordance with the user's knowledge of the actual key layout from the personal interface information (such as the key mapping).

When the server receives the user input it may use that information to authenticate the user (in the case where the entered user input is an authorization password or the like), and then process and implement the input as appropriate.

Figure 7:
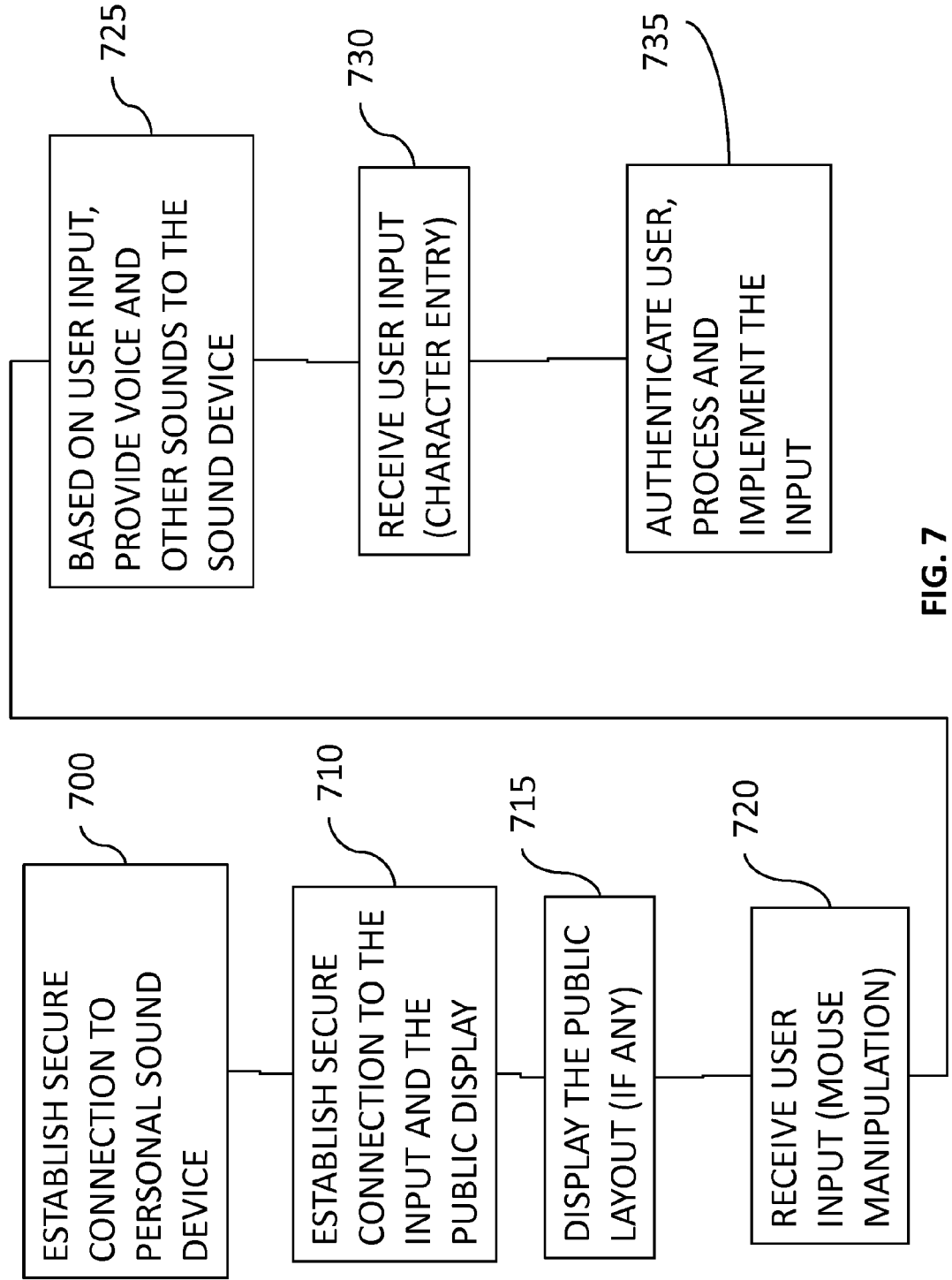

FIG. 7 shows a flowchart substantially similar to that of FIG. 6, but pertaining to the case where a personal sound device is used. Establishing secure connections (700 and 710) and displaying a public (blank) keypad layout (715) are substantially similar to the corresponding steps of FIG. 6.

User input, such as mouse manipulation (720) is received. This input indicates where, within the keyboard, the mouse cursor is sitting or moving. Accordingly, suitable sounds, such as voice speaking the name of the key, etc., is provided (725) to the sound device. Further user input, such as mouse clicks, keystrokes, etc., are then received (730).

Then, as before, the server authenticates entered passwords as appropriate, and otherwise processes the user's input (735).

System Block Diagram

Figure 8:
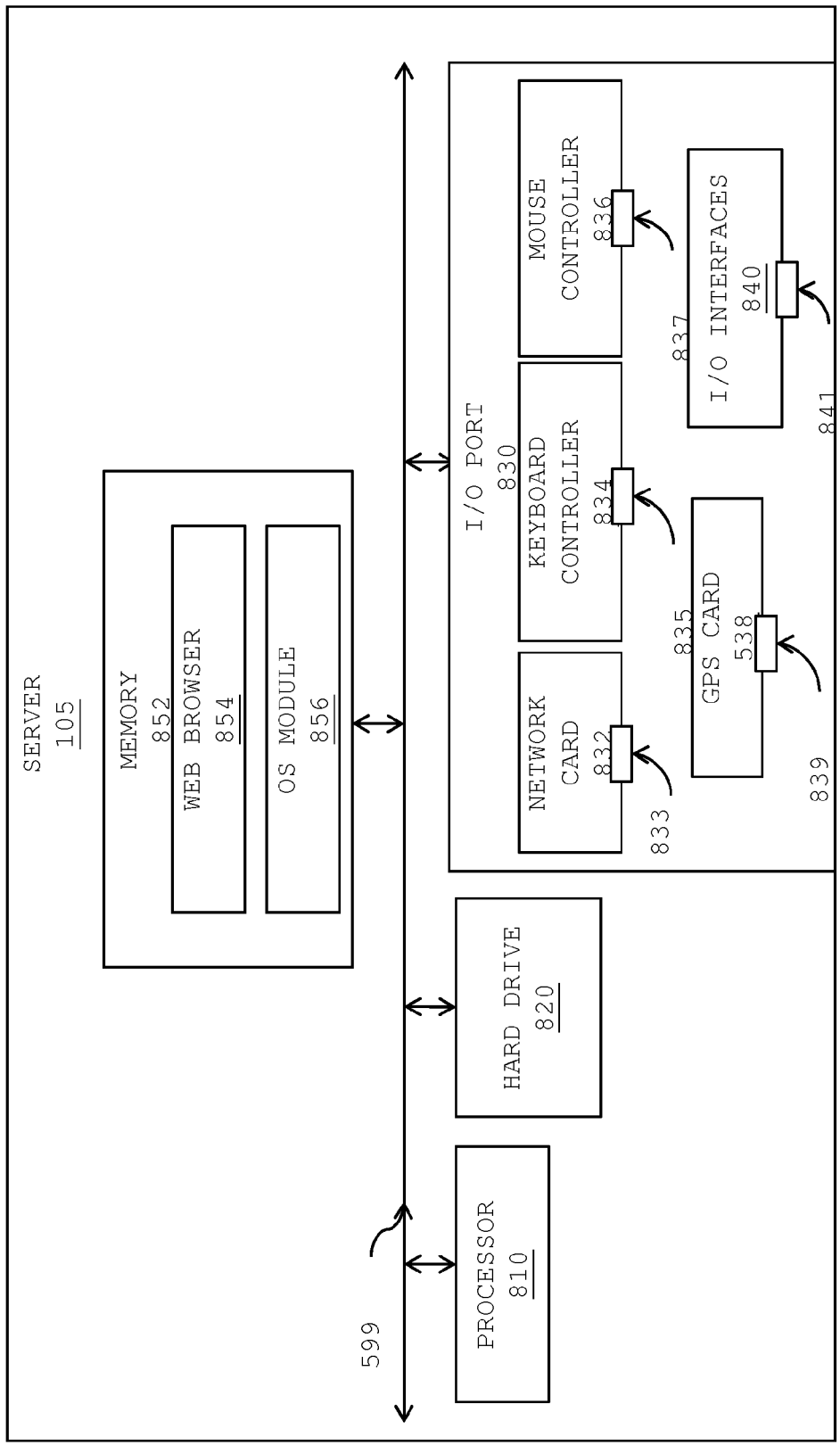
FIG. 8 is a system block diagram of a server in accordance with an embodiment.

Additional embodiments of the server 105 are described in detail in conjunction with FIG. 8.

FIG. 8 is a block diagram illustrating an exemplary computing device, for example the server 105 in accordance with one embodiment. The computing device 810 includes a processor 810, a hard drive 820, an I/O port 830, and a memory 852, coupled by a bus 899.

The bus 899 can be soldered to one or more motherboards. Examples of the processor 810 includes, but is not limited to, a general purpose processor, an application-specific integrated circuit (ASIC), an FPGA (Field Programmable Gate Array), a RISC (Reduced Instruction Set Controller) processor, or an integrated circuit. The processor 510 can be a single core or a multiple core processor. In one embodiment, the processor 810 is specially suited for processing demands of location-aware reminders (for example, custom micro-code, and instruction fetching, pipelining or cache sizes). The processor 810 can be disposed on silicon or any other suitable material. In operation, the processor 810 can receive and execute instructions and data stored in the memory 852 or the hard drive 820. The hard drive 820 can be a platter-based storage device, a flash drive, an external drive, a persistent memory device, or other types of memory.

The hard drive 820 provides persistent (long term) storage for instructions and data. The I/O port 830 is an input/output panel including a network card 832 with an interface 833 along with a keyboard controller 834, a mouse controller 836, a GPS card 838 and I/O interfaces 840. The network card 832 can be, for example, a wired networking card (for example, a USB card, or an IEEE 802.3 card), a wireless networking card (for example, an IEEE 802.11 card, or a Bluetooth card), and a cellular networking card (for example, a 3G card). The interface 833 is configured according to networking compatibility. For example, a wired networking card includes a physical port to plug in a cord, and a wireless networking card includes an antennae. The network card 532 provides access to a communication channel on a network. The keyboard controller 834 can be coupled to a physical port 535 (for example PS/2 or USB port) for connecting a keyboard. The keyboard can be a standard alphanumeric keyboard with 101 or 104 keys (including, but not limited to, alphabetic, numerical and punctuation keys, a space bar, modifier keys), a laptop or notebook keyboard, a thumb-sized keyboard, a virtual keyboard, or the like. The mouse controller 836 can also be coupled to a physical port 837 (for example, mouse or USB port). The GPS card 838 provides communication to GPS satellites operating in space to receive location data. An antenna 839 provides radio communications (or alternatively, a data port can receive location information from a peripheral device). The I/O interfaces 840 are web interfaces and are coupled to a physical port 841.

The memory 852 can be a RAM (Random Access Memory), a flash memory, a non-persistent memory device, or other devices capable of storing program instructions being executed. The memory 852 comprises an Operating System (OS) module 856 along with a web browser 854. In other embodiments, the memory 852 comprises a calendar application that manages a plurality of appointments. The OS module 856 can be one of Microsoft Windows® family of operating systems (for example, Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64.

The web browser 854 can be a desktop web browser (for example, Internet Explorer, Mozilla, or Chrome), a mobile browser, or a web viewer built integrated into an application program. In an embodiment, a user accesses a system on the World Wide Web (WWW) through a network such as the Internet. The web browser 854 is used to download the web pages or other content in various formats including HTML, XML, text, PDF, postscript, python and PHP and may be used to upload information to other parts of the system. The web browser may use URLs (Uniform Resource Locators) to identify resources on the web and HTTP (Hypertext Transfer Protocol) in transferring files to the web.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans (from Sun Microsystems) or Enterprise Java Beans (EJB from Sun Microsystems). Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standards 802.11, 802.11a, 802.11b, 802.11e, 802.11g, 802.11i, and 1802.11n). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A computer system comprising:
   a processor;
   a storage medium for tangibly storing thereon program logic for execution by the processor, the stored program logic comprising:
      transmitting logic executed by the processor for transmitting, to a user for display on a user output apparatus, a user input template comprising a key array template without a displayed keymap, the key array template comprising a number of keys greater than twelve keys; and
      personal input interface information transmitting logic executed by the processor for transmitting, to the user on a personal user output interface, personal input interface information, mapped to the user input template, to enable the user to input information, through a user input apparatus, that is intelligible only to a party having access to both the user input template and the personal input interface information, and comprising a private displayed keymap comprising the number of keys, the private displayed keymap comprising key values assigned to various keys of the key array template, the key values comprising a first plurality of key values representing a same numeric or symbol character value, and wherein the private displayed keymap includes a plurality of keys having no key values assigned thereto or a plurality of keys having duplicate key values.

2. The system as recited in claim 1, wherein the personal user output interface includes a personal display device.

3. The system as recited in claim 2, wherein the personal display device includes personal display eyeglasses.

4. The system as recited in claim 1, wherein the personal user output interface includes a personal audio output device for privately providing the user with audio information relating to the input information.

5. The system as recited in claim 4, wherein the personal audio output device includes a headset.

6. A method comprising:
   transmitting, by a processor, a user input template to a user via a user output apparatus, the user input template comprising a key array template without a displayed keymap, the key array template comprising a number of keys greater than twelve keys; and transmitting, by the processor, to the user, personal user output interface information, through a personal user output interface device, the personal user output interface information being mapped to the user input template, to enable the user to input information, through a user input apparatus, that is intelligible only to a party having access to both the user input template and the personal input interface information, and comprising a private displayed keymap comprising the number of keys, the private displayed keymap comprising key values assigned to various keys of the key array template, the key values comprising a first plurality of key values representing a same numeric or symbol character value, and wherein the private displayed keymap includes a plurality of keys having no key values assigned thereto or a plurality of keys having duplicate key values.

7. The method as recited in claim 6, wherein the personal user output interface device includes a personal display device.

8. The method as recited in claim 7, wherein the personal display device includes personal display eyeglasses.

9. The method as recited in claim 6, wherein the personal user output interface includes a personal audio output device for privately providing the user with audio information relating to the input information.

10. The method as recited in claim 9, wherein the personal audio output device includes a headset.

11. A non-transitory computer readable storage medium tangibly storing computer program instructions capable of being executed by a computer processor, the computer program instructions defining the steps of:

transmitting, to a user for display on a user output apparatus, a user input template comprising a key array template without a displayed keymap, the key array template comprising a number of keys greater than twelve keys; and transmitting, to the user on a personal user output interface, personal input interface information, mapped to the user input template, to enable the user to input information, through a user input apparatus, that is intelligible only to a party having access to both the user input template and the personal input interface information, and comprising a private displayed keymap comprising the number of keys, the private displayed keymap comprising key values assigned to various keys of the key array template, the key values comprising a first plurality of key values representing a same numeric or symbol character value, and wherein the private displayed keymap includes a plurality of keys having no key values assigned thereto or a plurality of keys having duplicate key values.

12. The medium as recited in claim 11, wherein the personal user output interface device includes a personal display device.

13. The medium as recited in claim 12, wherein the personal display device includes personal display eyeglasses.

14. The medium as recited in claim 11, wherein the personal user output interface includes a personal audio output device for privately providing the user with audio information relating to the input information.

15. The medium as recited in claim 14, wherein the personal audio output device includes a headset.

16. A method comprising:

displaying, by a user output apparatus of a client computer system, a user input template comprising a key array template without a displayed keymap, the key array template comprising a number of keys greater than twelve keys; and receiving, via a user input apparatus, input relating to personal input interface information received by a personal user output interface, the personal input interface information mapped to the user input template, so that the input is intelligible only to a party having access to both the user input template and the personal input interface information, and comprising a private displayed keymap comprising the number of keys, the private displayed keymap comprising key values assigned to various keys of the key array template, the key values comprising a first plurality of key values representing a same numeric or symbol character value, and wherein the private displayed keymap includes a plurality of keys having no key values assigned thereto or a plurality of keys having duplicate key values.

17. A method comprising:

receiving, by a personal user output interface, personal input interface information, the personal input interface information mapped to a user input template displayed by a user output apparatus of a client computer system so that an input received by the client computer system is intelligible only to a party having access both to the user input template and the personal input interface information, the user input template comprising a key array template without a displayed keymap, the key array template comprising a number of keys greater than twelve keys, and the personal input interface information comprising a private displayed keymap comprising the number of keys, the private displayed keymap comprising key values assigned to various keys of the key array template, the key values comprising a first plurality of key values representing a same numeric or symbol character value, and wherein the private displayed keymap includes a plurality of keys having no key values assigned thereto or a plurality of keys having duplicate key values.

18. A client computer system comprising:

a processor;

a storage medium for tangibly storing thereon program logic for execution by the processor, the stored program logic comprising:

display logic executed by the processor for displaying, by a user output apparatus of the client computer system, a user input template comprising a key array template without a displayed keymap, the key array template comprising a number of keys greater than twelve keys; and receiving logic executed by the processor for receiving, via a user input apparatus of the client computer system, input relating to personal input interface information received by a personal user output interface, the personal input interface information mapped to the user input template, so that the input is intelligible only to a party having access both to the user input template and the personal input interface information, and the personal input interface information comprising a private displayed keymap comprising the number of keys, the private displayed keymap comprising key values assigned to various keys of the key array template, the key values comprising a first plurality of key values representing a same numeric or symbol character value, and wherein the private displayed keymap includes a plurality of keys having no key values assigned thereto or a plurality of keys having duplicate key values.

* * * * *